United States Patent
Vinciarelli

(10) Patent No.: US 11,664,724 B1
(45) Date of Patent: *May 30, 2023

(54) POWER BUS VOLTAGE DROP COMPENSATION USING SAMPLED BUS RESISTANCE DETERMINATION

(71) Applicant: Vicor Corporation, Andover, MA (US)

(72) Inventor: Patrizio Vinciarelli, Boston, MA (US)

(73) Assignee: Vicor Corporation, Andover, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/690,674

(22) Filed: Mar. 9, 2022

Related U.S. Application Data

(63) Continuation of application No. 16/886,460, filed on May 28, 2020, now Pat. No. 11,290,005, which is a
(Continued)

(51) Int. Cl.
H02M 3/00 (2006.01)
H02M 1/00 (2006.01)

(52) U.S. Cl.
CPC ............ *H02M 3/00* (2013.01); *H02M 1/0019* (2021.05)

(58) Field of Classification Search
CPC .................................. H02M 3/00; H02M 1/00
See application file for complete search history.

(56) References Cited

U.S. PATENT DOCUMENTS

| | | | |
|---|---|---|---|
| 6,930,893 B2 | 8/2005 | Vinciarelli |
| 6,984,965 B2 | 1/2006 | Vinciarelli |
| 7,145,786 B2 | 12/2006 | Vinciarelli |

(Continued)

OTHER PUBLICATIONS

Bodo's Power Systems, Digital Controller Provides Real-Time Adaptive Loop Compensation, Blue Product of the Month, Oct. 2011, retrieved from the Internet at http://rohmfs.rohm.com/en/products/databook/static/powervation/BPS1110.pdf on Jun. 13, 2016, 1 page.

(Continued)

*Primary Examiner* — Rexford N Barnie
*Assistant Examiner* — Joseph N Inge
(74) *Attorney, Agent, or Firm* — Foley & Lardner LLP

(57) ABSTRACT

A power system includes a power conversion stage that receives power from an input source and delivers power to a load via a power distribution bus. The power distribution bus may include a DC transformer such as a fixed ratio bus converter or VTM having an equivalent series resistance. A control system samples the voltage delivered by the power conversion stage at a location close to the output of the power conversion stage, and the load voltage at a location close to the load. The samples may be synchronized by means of a data bus that provides communication between a control device and an output monitor. Synchronization may be accomplished within a sampling period that is short relative to changes in the voltages and currents. Each set of samples may be used to determine a value of the bus resistance. Multiple samples may be averaged to improve accuracy in the determination. The determined bus resistance, including the equivalent series resistance of any bus converter, may be used to introduce a negative resistance characteristic in the power conversion stage as a way of compensating for the actual bus resistance without resorting to full bandwidth feedback from the load.

20 Claims, 5 Drawing Sheets

Related U.S. Application Data continuation of application No. 15/179,521, filed on Jun. 10, 2016, now Pat. No. 10,700,599.

(56) References Cited

U.S. PATENT DOCUMENTS

| | | | |
|---|---|---|---|
| 7,202,646 B2 | 4/2007 | Vinciarelli | |
| 10,199,950 B1 | 2/2019 | Vinciarelli et al. | |
| 11,290,005 B1* | 3/2022 | Vinciarelli | H02M 3/00 |
| 2004/0174147 A1* | 9/2004 | Vinciarelli | H02M 1/088 |
| | | | 323/266 |
| 2011/0095742 A1* | 4/2011 | Lopata | H02M 3/1588 |
| | | | 323/283 |
| 2015/0303803 A1* | 10/2015 | Chen | H02M 3/158 |
| | | | 323/271 |
| 2016/0064998 A1* | 3/2016 | Maeda | H02M 7/217 |
| | | | 307/64 |
| 2017/0077819 A1 | 3/2017 | Andres | |
| 2019/0058393 A1* | 2/2019 | Elferich | H02M 3/335 |

OTHER PUBLICATIONS

Kollman, R., Power Tip 64: Compensate for Cable Drop Without Remote Sensing, EE Times, Oct. 9, 2013, retrieved from the Internet at http://www.eetimes.com/author.asp?doc_id=1319750 on Jun. 13, 2016, 3 pages.

Reuters, Digital Controller Provides Real-Time Adaptive Loop Compensation, Press Release, Sep. 26, 2011, retrieved from the Internet at http://www.reuters.com/article/idUS174575 Sep. 26, 2011 BW20110926 on May 30, 2016, 4 pages.

Rohm Semiconductor, Digital Controller Provides Real-Time Adaptive Loop Compensation, available at least as early as May 11, 2016, retrieved from the Internet at http://www.rohm.com/web/global/news-detail?news-title=digital-controller-provides-real-time-adaptive-loop-compensation&defaultGroupId=false, on Jun. 13, 2016, 2 pages.

Rohm Semiconductor, Digital Controller Provides Real-Time Adaptive Loop Compensation, retrieved from http://www.rohm.com/web/global/news-detail?news-title=digital-controller-provides-real-time-adaptive-loop-compensation&defaultGroupID=false, 1 page (May 11, 2016).

Salato, M., Accurate Point-of-Load Voltage Regulation Using Simple Adaptive Loop Feedback, Application Note, AN:024, Rev 1.4, Vicor PowerBench, Nov. 2013, 18 pages.

Williams, J., Compensate for wiring losses with remote sensing, EDN Network, Nov. 18, 2010, retrieved from the Internet at http://www.edn.com/design/analog/4363826/Compensate-for-wiring-losses-with-remote-sensing on Jun. 13, 2016, 5 pages.

* cited by examiner

POWER BUS VOLTAGE DROP COMPENSATION USING SAMPLED BUS RESISTANCE DETERMINATION

CROSS-REFERENCE TO RELATED APPLICATIONS

This application is a continuation of U.S. patent application Ser. No. 16/886,460, filed May 28, 2020, which is a continuation of U.S. patent application Ser. No. 15/179,521, filed Jun. 10, 2016, the entireties of both of which are incorporated herein by reference.

TECHNICAL FIELD

This invention relates to apparatus and methods for compensating for voltage errors introduced by a non-ideal power distribution connections between a power converter and a load.

BACKGROUND

Non-ideal connections between the output of a power converter and its load may introduce a voltage drop which may vary as a function of changes in load current owing to the resistance in the non-ideal connection. Traditional attempts to compensate for such errors include using negative feedback to compare the voltage at the load to a desired reference voltage requiring relatively high bandwidth connections between the load and the power converter due to the need to constantly monitor and control the voltage at the load. Other attempts have accounted for resistances in the system by providing a correction circuitry based on an expected resistance in the line. Thus, it would be advantageous to have systems and methods that provide for maintaining a voltage at a load, and accounting for variations in bus resistance over time, while reducing the bandwidth required to maintain a desired load voltage.

SUMMARY

One exemplary method of the present disclosure is a method of converting power. The method includes providing a first power conversion stage. The first power conversion stage including an input for receiving power from a power source and a first output for supplying power via a first power bus to a first load. The first load is electrically separated from the first output by a first bus resistance. The method further includes providing a control circuit adapted to provide a control signal to the first power conversion stage. The method further includes measuring a first load voltage at or near the first load, measuring a first output voltage at or near the first output, and measuring a first current flowing between the first output and the first load through the first power bus. The method additionally includes determining a representation of the first bus resistance as a function of the measuring using the control circuit. The method also includes sending a control signal to the first power conversion stage from the control circuit as a function of the representation of the first bus resistance. Furthermore, the method includes adjusting, in response to the control signal, the first power conversion stage to include a negative output resistance component configured to compensate for the first bus resistance.

Another exemplary embodiment of the present disclosure is a method of converting power. The method includes providing a plurality of power conversion stages each having a respective input for receiving power from a power source and a respective output for supplying power via a respective power bus to a respective load, each load being electrically separated from the respective output by a respective bus resistance. The method further includes providing a control circuit adapted to provide a respective control signal to the each of the plurality of power conversion stages. The method further includes measuring a respective load voltage of the power being supplied to each load at or near the load, and measuring a respective output voltage being supplied to each load at or near the respective output. The method further includes determining a representation of the respective bus resistance as a function of the respective measuring. The method also includes sensing a respective control signal to each power conversion stage as a function of the representation of the respective bus resistance. The method also includes adjusting, in response to a respective control signal, a response characteristic of each power conversion stage to include a negative output resistance component configured to compensate for the respective bus resistance.

Another exemplary embodiment of the present disclosure is a system of converting power. The system includes a first power conversion stage. The first power conversion stage includes an input for receiving power from a power source, and a first output for supplying power via a first power bus to a first load, the first load being electrically separated from the first output by a first bus resistance. The system further includes a control circuit. The control circuit is adapted to measure a first output voltage at or near the first output and a first current flowing between the first output and the first load through the first power bus. The system also includes an output monitor, the output monitor configured to measure a first load voltage at or near the first load. In the system, the control circuit is configured to determine a representation of the first bus resistance as a function of the measuring using the control circuit, and additionally configured to send a control signal to the first power conversion stage from the control circuit as a function of the representation of the first bus resistance. The first power conversion stage is configured to adjust a voltage at the first output to include a negative output resistance component to compensate for the first bus resistance in response to the first control signal.

DETAILED DESCRIPTION

Electronic systems may comprise one or more power sources (e.g. voltage regulators) that deliver power to one or more loads by means of one or more power distribution buses. A power distribution bus may comprise, e.g., cables, bus bars, printed circuit board traces and other conductive devices. Because the power distribution bus has finite resistance there will be a voltage drop in the bus that will vary as a function of load current. In some systems the effects of bus resistance may be minimized by providing distribution bus conductors of sufficiently large gauge to keep the maximum voltage drop in the bus below some desired maximum value. This, however, may result in a distribution bus that is bulky, heavy and costly. Another way to reduce the effects of distribution bus voltage drop is to control the voltage output of the power source as a function of the voltage measured at the load, thereby reducing or eliminating errors in voltage, e.g. due to voltage drop in bus as a function of load current. This approach has required using wideband feedback from the load, with associated additional interconnection, processing bandwidth, stability, and control issues.

Figure 1A:
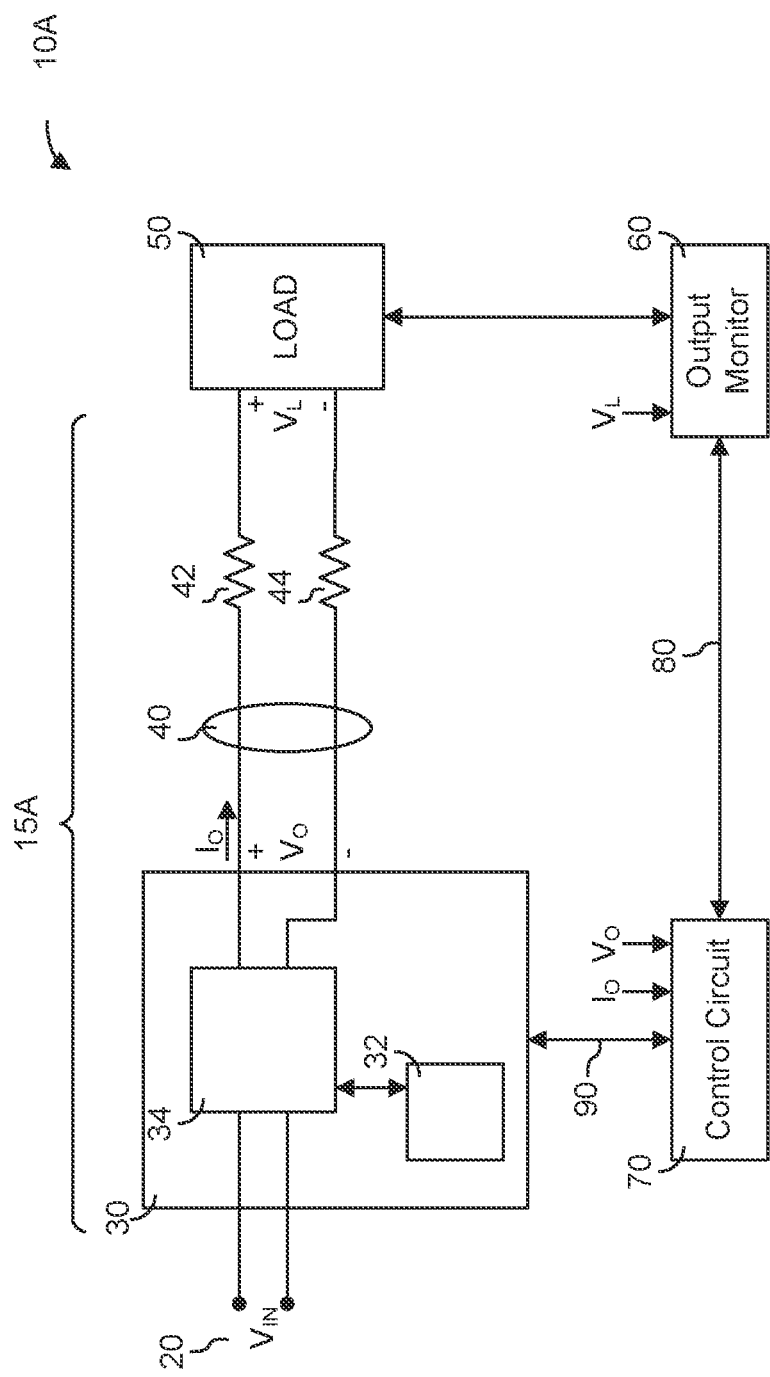
FIG. 1A shows a power delivery system according to one embodiment.

A first embodiment of a power distribution system 10A is shown in FIG. 1A having a power delivery stage 15A (comprising a power conversion stage 30 and a power distribution bus 40) connected to supply power to a load 50. The power conversion stage 30 receives power from an input source 20 and delivers power, at an output voltage $V_O$ and an output current $I_O$, to load 50 via a distribution bus 40. The total resistance, $R_B$, in the distribution bus is indicated in FIG. 1A by lumped bus resistances 42, 44. A power conversion controller 32 in the power conversion stage 30 may control the magnitude of the output voltage, $V_O$, by supplying a control signal to a voltage regulator 34 within the power conversion stage 30. The control bandwidth, BW, of the power conversion controller 32 may be sufficiently large to enable the voltage $V_O$ to be maintained within pre-defined limits (e.g. 0.1%, 1%) under normal operating conditions, e.g. at the maximum slew rate and variation in magnitude of the output current, $I_O$, demanded by the load 50.

A control circuit 70 may be provided to measure the output voltage, $V_O$, and optionally the output current, $I_O$, and to deliver a control signal 90 to the power conversion stage 30. The control circuit 70 may be configured as a function in a larger supervisory system for managing operation, e.g. power up, fault detection, and power down, of the power conversion stage 30, or as a dedicated auxiliary circuit. An output monitor 60 may be provided to measure the load voltage $V_L$ and optionally the output current, $I_O$, and communicate with the control circuit 70. The output monitor 60 may be similarly deployed as a function of a larger monitoring circuit, such as a supervisory load monitoring circuit, or as a dedicated auxiliary circuit. Data and control signals may pass between the control circuit 70 and the output monitor 60 via data bus 80, which may be of any form (e.g. analog, digital, physical conductors, wireless), and use any form of communication protocol (e.g. PMBus, I2C, etc.).

Bus resistance, $R_B$, causes a reduction in the load voltage, $V_L$, relative to the output voltage as a function of output current, $V_O$: $V_L = V_O - I_O * R_B$. A method for counteracting the effect of the bus voltage drop, $I_O * R_B$, comprises using the control circuit 70 to make measurements of the output voltage $V_O$, and using the output monitor 60 to make a measurement of the load voltage $V_L$, and using one or both of the control circuit 70 or output monitor 60 to measure the output current $I_O$. The measurements made by the output monitor 60, e.g. of $V_L$ and optionally $I_O$, may be provided to the control circuit via data bus 80. The control circuit 70 may use the measured values of $V_O$, $I_O$ and $V_L$ to determine a magnitude of bus resistance: $R_{BD} = (V_{OM} - V_{LM})/I_{OM}$, where $R_{BD}$ is the determined magnitude of the bus resistance, and $V_{OM}$, $V_{LM}$ and $I_{OM}$ are the respective measured values of $V_O$, $V_L$ and $I_O$. $R_{BD}$ may be delivered to the power conversion circuit 30, by means of control signal 90, where it may be used to alter the magnitude of $V_O(t)$ as a function of the magnitude of the load current $I_O$. If, for example, it is desired to maintain the load voltage at an essentially constant voltage $V_L = V_{LD}$, the power conversion circuit would set $V_O = V_{LD} R_{BD} * I_O$, where $V_{LD}$ is the desired load voltage. In this way, $V_O$ will be controlled to offset and compensate for the voltage drop in the power bus, $I_O * R_B$, thereby reducing or eliminating variations in $V_L$.

Figure 2:
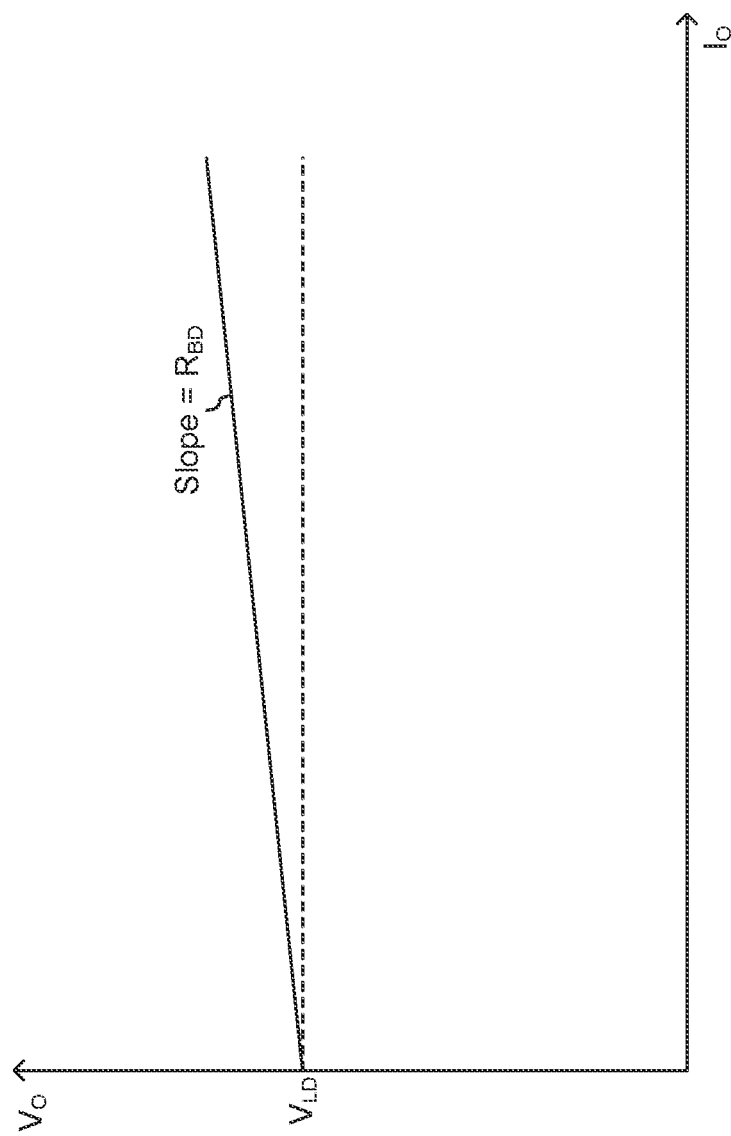
FIG. 2 shows a relationship between current and voltage in the systems of FIG. 1A.

The relationship between $V_O$ and $I_O$ is shown in FIG. 2. Because $V_O$ increases with increasing $I_O$, the power conversion stage 30 exhibits a negative output resistance characteristic that counteracts and compensates for the effects of the finite, positive, bus resistance.

The accuracy of the determined value of resistance, $R_{BD}$, will be affected by the relative timing (synchronization error) of the measurements of $V_O$, $V_L$ and $I_O$. Accuracy is improved if all of the measurements are made within a sampling time period during which the values of $V_O$, $V_L$ and $I_O$ do not vary significantly. The method may therefore comprise synchronizing the measurements of $V_O$, $V_L$ and $I_O$ to occur within a sampling period, $T_S$, that is short with respect to anticipated changes in $V_O$, $V_L$ and $I_O$. By this we mean that $T_S$ is short enough so that anticipated variations in average values of $V_O$, $V_L$ and $I_O$ do not exceed a small percentage (e.g., 0.1%, 1%) of their values at the beginning of the sampling period. For example, the sampling period may be a very small fraction of a second, e.g. 1 mS, 100 uS, 10 uS, 1 uS, 100 nS, 10 nS, etc. The control circuit 70 may synchronize the taking of the measurements by sending a synchronization signal to the output monitor 60, via data bus 80. Within a very short time after receiving the synchronization signal the output monitor 60 takes a sample of the load voltage, $V_{LM}$. Also within a very short time period of sending the synchronization signal, the control circuit 70 takes samples of output voltage, $V_{OM}$, and preferably the output current, $I_{OM}$. In this way, sampled measurements of $V_{OM}$, $V_{LM}$ and $I_{OM}$ may be synchronized to all be taken at some time, and preferably at the same time, within the short sampling period $T_S$.

Figure 3A:
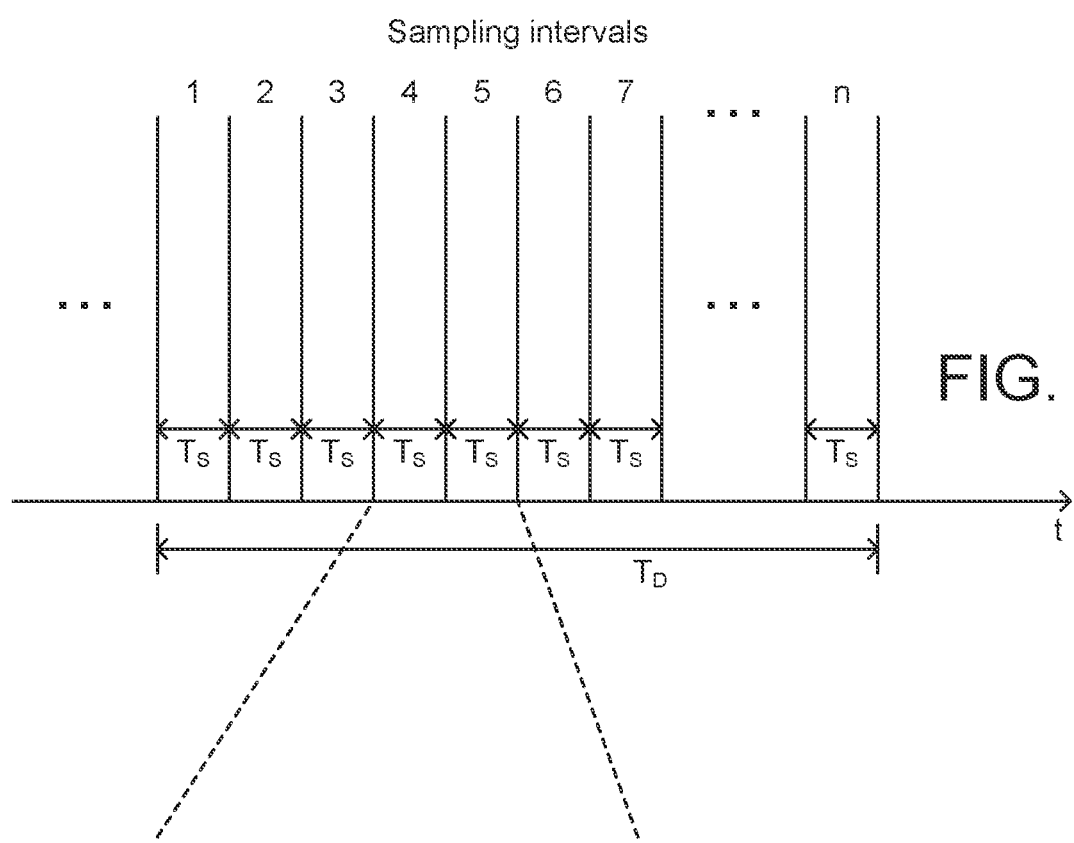
FIG. 3A illustrates sample timing in one embodiment of a power delivery system according to one embodiment.
Figure 3B:
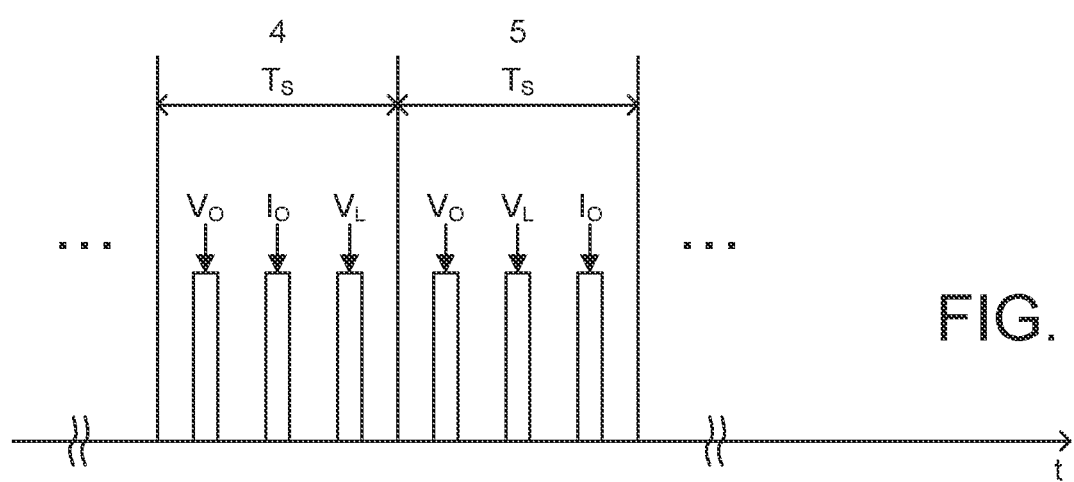
FIG. 3B illustrates an expanded view of the sample timing of FIG. 3A.

Effects associated with timing of samples and transient load changes may introduce errors into individual determined values of $R_{BD}$. The method may therefore incorporate an averaging process to improve accuracy in the determination of $R_{BD}$. For example, as illustrated in FIG. 3A, an averaging interval, TD, may comprise a finite number, N, of sequential sample intervals of length $T_S$. The averaging interval may preferably be made long relative to any synchronization errors in the samples. For example, a system may use 100 uS sampling intervals, $T_S$, and obtain 100 contiguous samples per 10 mS averaging interval, TD. As shown in FIG. 3B, which shows an expanded view of a portion of FIG. 3A, samples of $V_O$, $V_L$ and $I_O$ are taken within each sampling interval. The durations of both the sampling period, $T_S$, and the averaging interval, TD, are made short with respect to anticipated changes in the average values of $V_O$, $V_L$ and $I_O$. The N values of $R_{BD}$ that are determined during the averaging interval, TD, are averaged by control circuit 70 to provide an averaged determined value, $R_{BDA}$. $R_{BDA}$ is delivered to the power conversion circuit 30 where it is used, in the manner discussed earlier, to change the magnitude of $V_O$ as a function of the magnitude of the load current $I_O$: $V_O = V_{LD} + R_{BDA} * I_O$. Although sampling periods are shown to be contiguous in FIG. 3A, it is understood that sampling intervals may be separated in time within an averaging interval. Any suitable method of averaging the values may be used. For example, a simple mathematical average of all of the data points may be used to calculate the averaged determined value; alternatively the data points may be screened to eliminate any that differ by more than a predetermined percentage, such as 10% or 5% or less, from the other data points.

Although the bus resistance may change over time, e.g. due to temperature changes or other environmental effects, the changes should occur very slowly compared to $V_O$, $V_L$, and $I_O$ for typical electronic loads. The frequency with which the bus resistance or average bus resistance is determined and delivered to power conversion circuit 30 may therefore be low compared to the control bandwidth, BW, of the power conversion controller 32. Accordingly a single supervisory circuit or controller may be used to service a plurality of conversion circuits and loads.

Figure 1B:
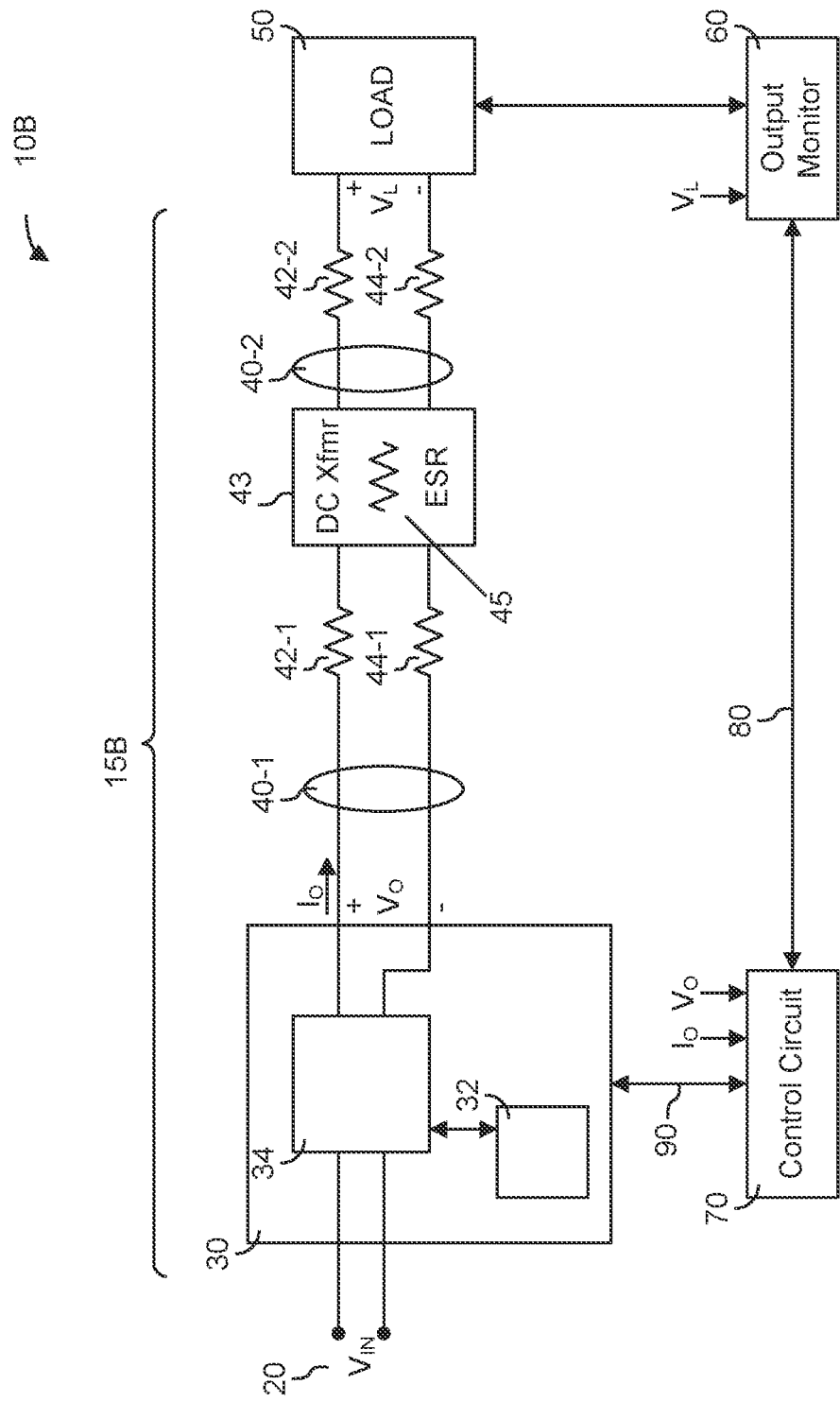
FIG. 1B shows the power delivery system of FIG. 1A, including a DC transformer, according to one embodiment.

A second embodiment of a power distribution system 10B is shown in FIG. 1B, having a power delivery stage 15B. The power delivery system 15B may be the same as power delivery system 15A, but further includes a DC transformer 43, such as a fixed-ratio bus converter, or voltage transformation module ("VTM"), in the power path between the regulator 34 and the load 50 to implement various power distribution architectures, as described below. Accordingly, operation of the system 10B in FIG. 1B is substantially the same as that of system 10A of FIG. 1A, except as described below. For example, power distribution architectures such as those described in Vinciarelli, *Factorized Power Architecture with Point of Load Sine Amplitude Converters*, U.S. Pat. No. 6,984,965, issued Jan. 10, 2006 (the "FPA Patent"), and in Vinciarelli et al., *Power Distribution Architecture with Series-Connected Bus Converter*, U.S. application Ser. No. 13/933,252 filed Jul. 2, 2013 (the "NIBA Application"), both of which are assigned to VLT, Inc., and are herein incorporated by reference, in their entirety may be implemented.

As defined herein, the DC transformer 43 delivers a DC output voltage, $V_{OUT}$, which is a fixed fraction of the input voltage, VIN, delivered to its input. The DC transformer 43 may also provide isolation between an input of the DC transformer 43 and an output of the DC transformer 43. The voltage transformation ratio and/or voltage gain of the DC-transformer 43 is defined herein as the ratio of the output voltage to the input voltage at a load current. Expressed mathematically, the voltage transformation ratio and/or voltage gain may be expressed as $K=V_{OUT}/V_{IN}$. The voltage transformation ratio of a DC transformer, such as DC transformer 43, may be fixed by design, e.g. by a converter topology, timing architecture, and/or the turns ratio of the transformer.

In one embodiment, the DC transformer 43 may be implemented using Sine-Amplitude Converter ("SAC") topologies and/or timing architectures, such as those described in Vinciarelli, *Factorized Power Architecture and Point of Load Sine Amplitude Converters*, U.S. Pat. No. 6,930,893, and in Vinciarelli, *Point of Load Sine Amplitude Converters and Methods*, U.S. Pat. No. 7,145,786, both assigned to VLT, Inc., and incorporated herein by reference in their entirety (hereinafter the "SAC Patents"), as well as those described in the NIBA Application, discussed above. The DC transformer 43, using a SAC topology, may be capable of achieving very high power densities and conversions efficiencies for voltage transformation at an essentially resistive output resistance. The SAC topology may also provide galvanic isolation between an input of the DC transformer 43 and an output of the DC transformer 43, with an equivalent output resistance. To the extent the DC transformer 43 is essentially resistive and experiences voltage droop with increases in current, the sampled bus compensation system may be used to correct for the equivalent series resistance 45 of the DC transformer 43 in addition to the lumped bus resistances 42-1, 42-2, 44-1, 44-2, of the bus segments 40-1, 40-2. As described in the '965 Patent and the '252 Application, the DC transformer 43 may provide voltage reduction and current multiplication. In one embodiment, the voltage gain may be less than one (K<1), or more preferably, (K≤¼). Further, the DC transformer may be located relatively closer to the load 50, than to the regulator 34, thereby allowing the output voltage, $V_O$, of the regulator 34 to be greater than the load voltage, $V_L$. In one embodiment, the output voltage, $V_O$, is greater than the load voltage, $V_L$, by a factor of four or more.

Figure 4:
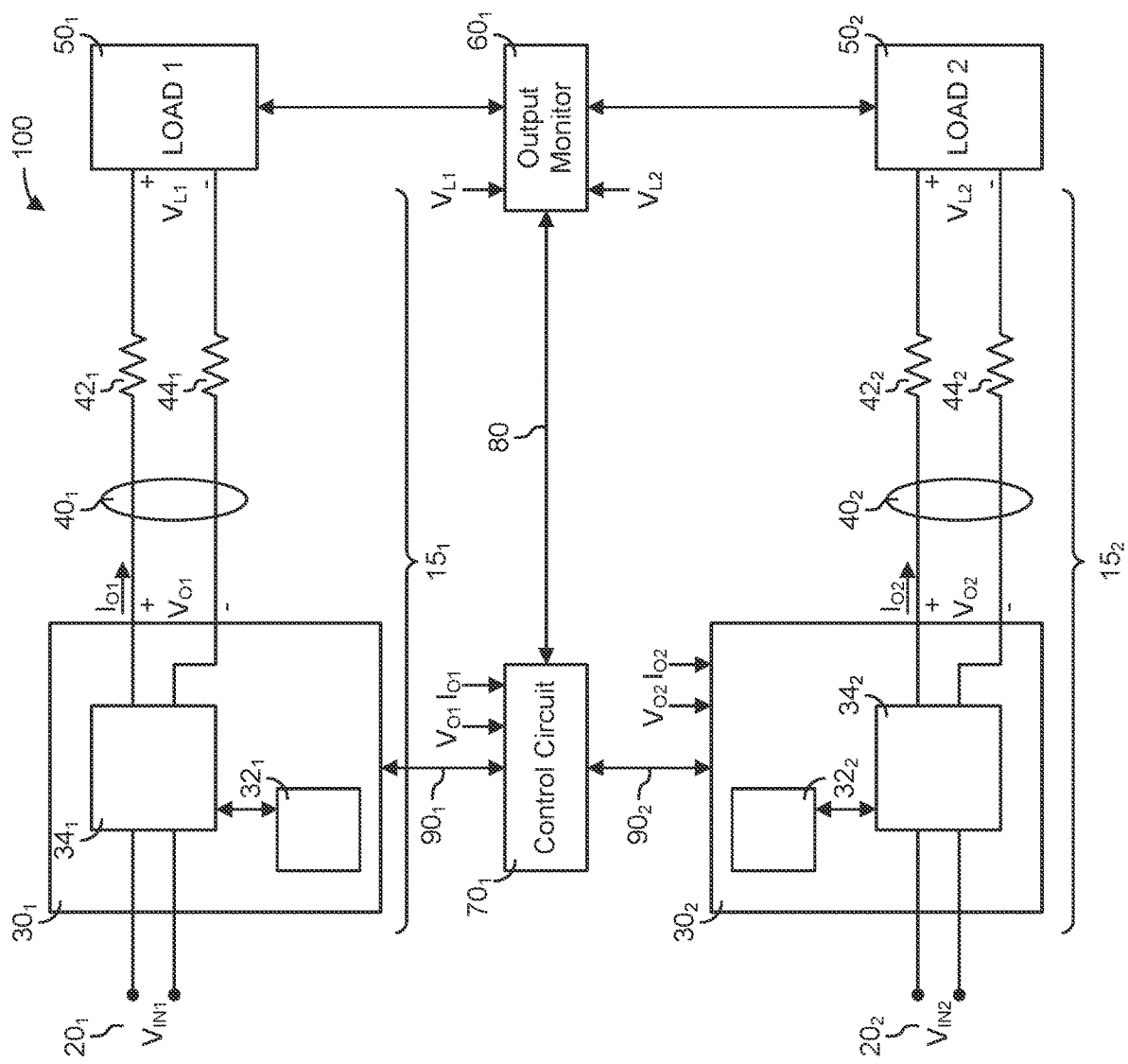
FIG. 4 shows another power delivery system according to one embodiment.

FIG. 4 shows an embodiment of a power distribution system 100 having a plurality of power delivery stages, $15_1$, $15_2$, each of the kind shown in FIG. 1A and each comprising an input source $20_1$, $20_2$, a power conversion stage $30_1$, $30_2$, a distribution bus $40_1$, $40_2$ and a load $50_1$, $50_2$. The input voltages, Vin1 and Vin2, may come from different sources $20_1$, $20_2$, or the input voltages Vin1 and Vin2 may come from the same source. The total resistance in each distribution bus $40_1$, $40_2$ is indicated in FIG. 4 by lumped bus resistances $42_1$, $44_1$ and $42_2$, $44_2$. Operation of the system of FIG. 4 is substantially the same as that of the system 10A of FIG. 1A, except that the system of FIG. 4 uses a single control circuit 701, a single output monitor 601 and a single data bus 801 to determine bus resistances, and optionally averaged bus resistances, for the multiplicity of power delivery stages $15_1$, $15_2$, and communicate those resistances to the respective power conversion stages $30_1$, $30_2$ as control signals 901, 902. Although the system of FIG. 4 shows two power delivery stages $15_1$, $15_2$, it will be evident that any number of power delivery stages can be operated in accordance with the methods described herein. Furthermore, a single control circuit 701 can be used to provide a control signal to several (e.g. 3, 5, 12, etc.) power conversion stages and a single output monitor 601 can be used to sample and communicate data from several loads (e.g. 4, 7, 11). The numbers of control circuits and output monitors may be different, depending on performance capabilities and requirements, and the number of data buses required will depend on the nature of the selected communication technique. The sampled bus compensation system described above may provide superior performance compared to other techniques because it may be used to compensate for the initial value tolerance, variability in time and temperature dependency of all resistive elements in the power path.

A number of embodiments of the invention have been described. Nevertheless, it will be understood that various modifications may be made without departing from the spirit and scope of the invention. For example, essentially complete cancellation of bus resistance may not be required in all systems; in such systems the magnitude of $R_{BD}$ may be scaled appropriately.

The invention claimed is:
1. A method of supplying power comprising:
providing a control circuit adapted to provide a control signal to a first power conversion stage;
sending a synchronization signal;
sampling a value of a first output voltage at or near a first output of the first power conversion stage in synchrony with the synchronization signal;
sampling in synchrony with the synchronization signal, a value of a first load voltage at or near a first load connected to the first output;

sampling a value of a first current flowing between the first output and the first load in synchrony with the synchronization signal;

wherein the samplings of the values of the first output voltage, the first load voltage, and the first current occur within a sampling period $T_S$;

determining, by the control circuit, a representation of a first bus resistance as a function of the sampling of the values of the first output voltage, the first load voltage, and the first current; and using the control circuit to send a control signal based upon the representation of the first bus resistance to the first power conversion stage, the control signal indicating a negative output resistance component configured to compensate for the first bus resistance.

2. The method of claim 1 further comprising adjusting the first output voltage to compensate for the first bus resistance.

3. The method of claim 1 further comprising adjusting, in response to the control signal, the first power conversion stage to include the negative output resistance component configured to compensate for the first bus resistance.

4. The method of claim 1, wherein the control circuit services a plurality of power conversion stages including the first power conversion stage and a plurality of loads including the first load.

5. The method of claim 1, further comprising:
screening the samplings of the values to remove values that differ by more than a predetermined amount.

6. The method of claim 1, wherein $T_S$ is low compared to a control bandwidth of the control circuit.

7. The method of claim 1 further comprising adjusting, the first power conversion stage to include the negative output resistance component configured to compensate for an average representation of the first bus resistance.

8. A method of converting power comprising:
providing a control circuit adapted to provide a control signal to a first power conversion stage;
sampling a value of a first output voltage at or near a first output of the first power conversion stage;
sampling a value of a first load voltage at or near a first load connected to the first output;
sampling a value of a first current flowing between the first output and the first load;
determining a sampled value for a first bus resistance using the sampled values of the first output voltage, the first load voltage, and the first current;
the control circuit repeating the sampling and determining steps to accumulate a plurality of sampled values and determine an average representation for the first bus resistance using the plurality of sampled values; and
the control circuit adjusting the control signal to represent a negative output resistance component configured to compensate for the average representation of the first bus resistance.

9. The method of claim 8 further comprising adjusting the first power conversion stage to include a negative output resistance component configured to compensate for the average representation of the first bus resistance.

10. The method of claim 8, wherein determining the average representation is accomplished by averaging a plurality of calculated values of the first bus resistance.

11. The method of claim 8, further comprising:
screening the plurality of sampled values to remove values that differ by more than a predetermined amount.

12. The method of claim 8, wherein the control circuit services a plurality of power conversion stages including the first power conversion stage and a plurality of loads including the first load.

13. The method of claim 8, wherein the respective samplings occur within a sampling period $T_S$, and wherein the repeating of the respective samplings is performed over an averaging interval that is long compared to $T_S$ and short relative to changes in the value of the first output voltage, the value of the first load voltage, and the value of the first current.

14. The method of claim 13, wherein $T_S$ is low compared to a control bandwidth of the control circuit.

15. The method of claim 13, wherein $T_S$ is short enough so that variations in average values of the first output voltage, the first load voltage, and the first current do not exceed a predetermined percentage of their values at a start of $T_S$.

16. A method of converting power comprising:
providing a first power conversion stage including an input for receiving power from a power source and a first output with an associated first output voltage for supplying power via a first power bus to a first load with an associated first load voltage, the first load being electrically separated from the first output by a first bus resistance, wherein there is a first current flowing between the first output and the first load;
providing a control circuit adapted to provide a control signal to the first power conversion stage;
sending, by the control circuit, a synchronization signal;
sampling a value of the first output voltage at or near the first output of the first power conversion stage in synchrony with the synchronization signal;
sampling a value of a first load voltage at or near a first load connected to the first output in synchrony with the synchronization signal;
sampling a value of a first current flowing between the first output and the first load in synchrony with the synchronization signal;
wherein the respective samplings occur within a sampling period $T_S$;
determining a sampled value for a first bus resistance using the sampled values of the first output voltage, the first load voltage, and the first current;
the control circuit repeating the sampling and determining steps to accumulate a plurality of sampled values and determine an average representation for the first bus resistance using the plurality of sampled values; and
the control circuit sending the control signal to the first power conversion stage to represent a negative output resistance component configured to compensate for the average representation of the first bus resistance.

17. The method of claim 16, wherein the repeating of the respective samplings is performed over an averaging interval that is long compared to $T_S$ and short relative to changes in the value of the first output voltage, the value of the first load voltage, and the value of the first current.

18. The method of claim 16, wherein determining the average representation is accomplished by averaging a plurality of calculated values of the first bus resistance;
wherein $T_S$ is low compared to a control bandwidth of the control circuit.

19. The method of claim 18, wherein $T_S$ is short enough so that variations in average values of the first output voltage, the first load voltage, and the first current do not exceed a predetermined percentage of their values at a start of $T_S$.

20. The method of claim 19, wherein the predetermined percentage is less than or equal to 1%.

\* \* \* \* \*